United States Patent [19]
Fukushima et al.

[11] Patent Number: 4,472,332
[45] Date of Patent: Sep. 18, 1984

[54] PROCESS FOR THE PRODUCTION OF POROUS CERAMIC MOLDED ARTICLES

[75] Inventors: Shigeyoshi Fukushima; Masaaki Mizuno; Hideaki Koga, all of Osaka, Japan

[73] Assignee: The Toyo Rubber-Industry Co., Ltd., Osaka, Japan

[21] Appl. No.: 468,745

[22] Filed: Feb. 22, 1983

Related U.S. Application Data

[63] Continuation of Ser. No. 240,667, Mar. 5, 1981, abandoned.

[30] Foreign Application Priority Data

Mar. 5, 1981 [JP] Japan .................................. 55-28256

[51] Int. Cl.³ ............................................. B29H 7/20
[52] U.S. Cl. ...................................... 264/44; 264/86; 501/1
[58] Field of Search ................. 264/44, 86; 501/1, 82; 521/112

[56] References Cited

U.S. PATENT DOCUMENTS 3,793,237 2/1974 Watkinson .......................... 521/112
3,833,386 9/1974 Wood et al. .......................... 264/44

FOREIGN PATENT DOCUMENTS 12927 6/1929 Japan .

Primary Examiner—Paul Lieberman
Assistant Examiner—W. Thompson
Attorney, Agent, or Firm—Sughrue, Mion, Zinn, Macpeak & Seas

[57] ABSTRACT

A process for the production of a porous ceramic mold is described, compsiging adding about 40 to 60 parts by weight of water to 100 parts by weight of a ceramic material, mixing the thus-formed ceramic slurry with about 20 to 40 parts by weight of a hydrophilic urethane prepolymer having a free isocyanate group content of from about 4% to 7% by weight, reacting and foaming the resulting mixture after the introduction thereof into a mold, drying the thus-formed foamed urethane molded article, and combusting very slowly and sintering the dried foamed urethane molded article to produce a porous ceramic molded article.

8 Claims, No Drawings

PROCESS FOR THE PRODUCTION OF POROUS CERAMIC MOLDED ARTICLES

This is a continuation, of application Ser. No. 240,667, filed Mar. 5, 1981, now abandoned.

FIELD OF THE INVENTION

This invention relates to a process for the production of porous ceramic molded articles.

BACKGROUND OF THE INVENTION

Porous ceramic materials are used as filter media, for ion exchange resins, as membranes, as absorbents as catalyst carriers, as a refractory brick material, as a heat insulator material, as a building material, etc., because of its excellent anticorrosion, heat resistance, and strength properties.

Various methods to produce such porous ceramic materials are known. Of these known methods, a method of producing a porous ceramic mold by baking a mixture of a ceramic material and a polyurethane foam to remove the polyurethane and at the same time to sinter the ceramic material has recently received increasing attention because it facilitates obtaining a molded article having a desired form.

For example, in accordance with a method described in Japanese Patent Publication No. 12927/79, 75 to 150 parts by weight of water is added to 100 parts by weight of a refractory material powder to prepare a slurry, a hydrophilic urethane prepolymer having an isocyanate group(s) at the terminal portion thereof, which is prepared by reacting a polyethylene oxide compound or copolymer consisting of from 95 to 70 of ethylene oxide and from 5 to 30 of alkylene oxide containing at least 3 carbon atoms, having an average molecular weight of from 1,000 to 20,000, with an isocyanate compound having at least 2 isocyanate groups at the terminal portions thereof, is added to the above-prepared slurry in an amount of from 3 to 30 parts by weight per 100 parts by weight of the water (i.e., weight ratio of the prepolymer/water is from 3/100 to 30/100), and the resulting mixture is then placed in a mold, dried and fired to produce a refractory and heat-insulative brick.

This known method, however, has the following disadvantages: (1) since the composition consisting of the refractory material powder, water and hydrophilic urethane prepolymer has a high water content, when a urethane foamed article molded in the mold is removed therefrom and then dried, the shrinkage of the urethane foamed article is great and cracking often occurs in firing the urethane foamed article; (2) since the composition has a high water content, the refractory material powder is easily precipitated and, thus, molding thereof is difficult; (3) since the urethane prepolymer content of the composition is small, the urethane foamed article obtained has poor strength, the time (cycle time) required until the urethane foamed article can be removed from the mold is relatively long, and the porosity of the article is small because of its low expansion ratio (expanded volume/original volume), and it is thus difficult to obtain an article having a small specific gravity; and (4) in order to increase the heat insulative properties, it is desirable to increase the closed cell content since the prior method is intended to provide a heat-insulative brick (i.e., the material produced according to Japanese Patent Publication No. 12927/79 teaches only providing a material having a high closed cell content).

A porous ceramic mold obtained by the foregoing known method is not suitable for use as a filter medium, a catalyst carrier, a sound-absorbing material, etc., for which the open cell structure is required.

SUMMARY OF THE INVENTION

The object of this invention is to overcome the disadvantages of the prior art method and to provide excellent porous ceramic molded articles.

This invention, therefore, provides a process for the production of a porous ceramic molded article comprising adding from about 40 to 60 parts by weight of water to 100 parts by weight of a ceramic material to prepare a ceramic slurry, adding from about 20 to 40 parts by weight of a hydrophilic urethane prepolymer having a free isocyanate content of from about 4% to 7% by weight (i.e., weight ratio of the prepolymer/water is from 33/100 to 100/100), which is prepared by reacting an ethylene oxide-propylene oxide copolymer having an average molecular weight of from about 1,500 to 3,500 and an ethylene oxide content of from about 70 to 90% by weight with polyisocyanate compounds containing at least 2 isocyanate groups at the terminal portions thereof, to the above-prepared ceramic slurry, introducing the thus-obtained mixture into a mold, reacting and foaming to form a foamed urethane molded article, and then drying, combusting very slowly, and sintering the foamed urethane article to produce a porous ceramic molded article.

DETAILED DESCRIPTION OF THE INVENTION

By the term "ceramic material" as used herein is meant a substance capable of being converted generally into a sintered body by heating at high temperatures. Examples of such substances which can be used include kaolin, clay, alumina, feldspar, pottery stone, mullite, zircon, zirconia, titania, silicon carbide, and cordierite. These substances can be used alone or in combination with each other.

The amount of water added to a prepare a ceramic slurry should be within the range of from about 40 to 60 parts by weight per 100 parts by weight of the ceramic material. When the amount of water is less than 40 parts by weight, the viscosity of the ceramic slurry is increased, making the handling difficult, whereas when the amount of water is greater than 60 parts by weight, the disperson stability of the ceramic slurry is deteriorated, causing the ceramic material to easily precipitate, and the water content of the urethane foamed article is increased, promoting the shrinkage of a foamed molded article during drying thereof.

The amount of water added is controlled within the foregoing range depending on the grain size of the ceramic material. It is preferred that when the grain size is large, the amount of water added is reduced, whereas when the grain size is small, a relatively large amount of water is added. This water is added for the purpose of causing the reaction and foaming of the hydrophilic urethane prepolymer as described hereinafter, as well as for the purpose of preparing the ceramic slurry.

The ceramic slurry may contain an inorganic or organic dispersing agent. Suitable example of the inorganic dispersing agent includes sodium pyrophosphate, sodium carbonate, etc. Suitable example of the organic dispersing agent includes sodium carboxymethyl cellulose, tantalic acid, etc. The inorganic and organic dispersing agent is preferably used in the range of from about 0.01 to 0.1 part by weight per 100 parts by weight of the ceramic material.

The hydrophilic urethane prepolymer as used herein is prepared by reacting an ethylene oxide-propylene oxide copolymer having an average molecular weight of from about 1,500 to 3,500, preferably from about 2,500 to 3,000, and an ethylene oxide content of from about 70% to 90% by weight, with a polyisocyanate compound containing at least 2 isocyanate groups at the terminal portions thereof, and has a free isocyanate group content of from about 4% to 7% by weight.

When the average molecular weight of the foregoing ethylene oxide-propylene oxide copolymer is less than 1,500, the hydrophilic properties of the urethane prepolymer obtained are reduced and furthermore the balance in the gelation and foaming of the urethane prepolymer is deteriorated, and thus a foamed urethane having a desired degree of porosity cannot be obtained. On the other hand, when the average molecular weight of the ethylene oxide-propylene oxide copolymer is greater than 3,500, the gelation rate of the urethane prepolymer is reduced, the cycle time of the molding process is lengthened, and the strength of the foamed urethane molded article is lowered.

The ethylene oxide content of the ethylene oxide-propylene oxide copolymer should be within the range of from about 70% to 90% by weight. In lesser amounts than 70% by weight, the hydrophilic properties of the urethane prepolymer are reduced and, therefore, no uniform dispersion of the urethane prepolymer in the ceramic slurry can be attained, resulting in the cracking or deformation of the foamed urethane molded article during the combusting very slowly or combusting in the lack of oxygen thereof. On the other hand, in greater amounts than 90% by weight, the viscosity of the urethane prepolymer is increased, and thus the handling of the urethane prepolymer becomes difficult.

A suitable example of a polyisocyanate containing 2 isocyanate groups at the terminal portions thereof is tolylenediisocyanate. Other polyisocyanate compounds, such as methylenebis(phenylenediisocyanate) can be used in combination with the tolylenediisocyanate within the range that the hydrophilic properties of the tolylenediisocyanate are not deteriorated.

The free isocyanate group content of the urethane prepolymer obtained is within the range of from about 4% to 7% by weight. When the free isocyanate group content is less than 4%, the foaming can be performed only with difficulty, the strength of the urethane foamed article is poor, and furthermore the removal of the urethane foamed article from the mold becomes difficult. On the other hand, when the free isocyanate group content is greater than 7% by weight, the reaction in the mold proceeds vigorously and cannot be controlled with ease, and thus the foam has a tendency to collapse, making it difficult to obtain a foamed urethane article wherein the foam is uniformly distributed.

The amount of the hydrophilic urethane prepolymer added to the ceramic slurry is within the range of from about 20 to 40 parts by weight per 100 parts by weight of the ceramic material. When the amount of the urethane prepolymer is less than 20 parts by weight, the foaming power of the urethane prepolymer is reduced, as a result of which the porosity of the foamed urethane article is decreased, the specific gravity is increased, and the strength is deteriorated. On the other hand, when the amount is greater than 40 parts by weight, the expansion ratio is undesirably increased, the shrinkage and deformation of the foamed urethane article during drying thereof are increased, and furthermore the strength of the baked porous ceramic molded article is reduced.

According to the present invention, the weight ratio of the prepolymer/water is within the range of from about 33/100 to 100/100. But, the weight ratio of the prepolymer/water of the Japanese Patent Publication No. 12927/79 is within the range of from 3/100 to 30/100 and is lower than that of present invention. The high weight ratio of the prepolymer/water according to the present invention can increase open-cell content of the resulting foamed urethane articles.

To the foregoing hydrophilic urethane prepolymer can be added an open-cell foaming agent. A suitable example of such open-cell foaming agents is a polydimethyl siloxane-polyoxy alkylene copolymer. The amount of the open-cell foaming material added is appropriately from about 1 to 2 parts by weight per 100 parts by weight of the ceramic material. This open-cell foaming agent is used as an open-cell-controlling agent for a rigid urethane foam. In the foaming of polyurethane, the open-cell foaming agent collapses part of the foam formed, to facilitate obtaining an open-cell foamed urethane molded article. Such open-cell foamed urethane articles show reduced shrinkage and deformation during the drying stage and reduced cracking and deformation during the combusting very slowly or combusting in the lack of oxygen stage. The foregoing open-cell foaming agent increases the dispersibility of the hydrophilic urethane prepolymer in the ceramic slurry. However, when the open-cell foaming agent is directly added to and mixed with the ceramic slurry, the viscosity of the ceramic slurry is increased because its dispersibility in water is poor, and the open-cell foaming agent is liable to be hydrolyzed. Therefore, it is preferred that the open-cell foaming agent be added to the hydrophilic urethane prepolymer.

The ceramic slurry and the hydrophilic urethane prepolymer as described above are mixed and thoroughly stirred, introduced into a mold, and then reacted and foamed in the mold to obtain a foamed urethane molded article. The polymerization reaction between the ceramic slurry and the prepolymer occurs soon after the mixing thereof. The polymerization reaction in the mold is performed at a temperature of from about room temperature to 50° C. for a period of from 3 to 5 minutes. Usually, a polymerization catalyst is not necessary. However, a tin catalyst or an amine catalyst being conventionally used in a urethane reaction can be used in the above polymerization reaction. Suitable examples of the polymerization catalyst are, for example, dibutyl tin dilaurate, trimethyl amine, triethanol amine, etc.

The thus-obtained foamed urethane article is removed from the mold and then dried at about 80° C. to 100° C. for from about 15 to 24 hours to remove the water contained therein.

Subsequently, the thus-dried foamed urethane article is heated in a furnace at high temperatures. This heating is performed to combust very slowly or combust in the lack of oxygen the polyurethane and to sinter the ceramic material. The combustion of the polyurethane can be achieved gradually heating from about ordinary temperature to 400° C., preferably from 100° C. to 400° C. The temperature at which the sintering of the ceramic material can be achieved is usually at least about 1,100° C., although it varies depending on the type of the ceramic material used. After the sintering is completed, the porous ceramic mold obtained is allowed to gradually cool, and is then removed from the furnace.

In accordance with the method of this invention, since the water content of the composition to be introduced into the mold is small, and the hydrophilic urethane prepolymer has a specified composition, the gelation and foaming in the mold are well balanced, the strength of the foamed urethane article is high, the cycle time of the mold is shortened (resulting in an increase in productivity), and the removal of the foamed urethane article from the mold is facilitated. Furthermore, the shrinkage and deformation of the foamed urethane article during the drying thereof are greatly reduced, and moreover the cracking and deformation of the foamed urethane article at the baking thereof are reduced. In particular, when an open-cell foaming agent is added to produce open-cells, the foamed urethane article is dried uniformly and the drying is accelerated. Furthermore, the shrinkage and deformation are significantly reduced. Moreover, in accordance with the method of this invention, the cell size and the specific gravity can be easily controlled.

The following Examples and Comparative Examples are provided to illustrate this invention in greater detail.

EXAMPLE 1

To a ceramic mixture of 30 parts by weight of liparite (contains mainly quartz and feldspar) (average particle 25μ), 30 parts by weight of koalin (average particle 5μ) and 40 parts by weight of feldspar (average particle 30μ), there were added 50 parts by weight of water and 0.1 part by weight of sodium pyrophosphate, and the resulting mixture was then uniformly mixed and stirred to produce a ceramic slurry.

Using ethylene glycol as an initiator, 1 mol of an ethylene oxide-propylene oxide copolymer (average molecular weight: 3,000; ethylene oxide content: 80% by weight) and 3 mols of tolylenediisocyanate were reacted at 120° C. for 3 hours to prepare a hydrophilic urethane prepolymer (free isocyanate group content: 4.7% by weight). To 25 parts by weight of the hydrophilic urethane prepolymer was added 1 part by weight of an open-cell foaming agent (produced under the trademark of Y-6827 by Nippon Yunicar Co., Ltd.).

Thereafter, the thus-prepared ceramic slurry and hydrophilic urethane prepolymer were thoroughly stirred to prepare a uniform mixture. The thus-obtained mixture was introduced in a predetermined amount into a cylindrical mold (diameter: 50 mm; length: 280 mm) made of polyvinyl chloride, the inner surface of which had been coated with a silicon releasing agent, and reacted and foamed at room temperature for 5 minutes.

The foamed urethane article thus obtained was removed from the mold, and dried at 80° C. for 24 hours in a drier. Then, the dried foamed urethane article was placed in an electric furnace, and it was combusted by raising to 400° C. over a period of 5 hours and then to 1,150° C. over a period of 2 hours, and by maintaining at 1,150° C. for 1 hours. After the sintering was completed, the article was allowed to cool over a period of 15 hours to obtain an open-cell construction ceramic mold having a bulk specific gravity of 0.53, a porosity of 78%, and an average cell diameter of 0.5 mm.

EXAMPLE 2

A porous ceramic mold was produced in the same manner as in Example 1 except that no open-cell foaming agent was added to the hydrophilic urethane prepolymer.

COMPARATIVE EXAMPLE 1

A porous ceramic mold was produced in the same manner as in Example 1 except that the amount of water used in preparing the ceramic slurry was increased to 100 parts by weight.

COMPARATIVE EXAMPLE 2

A porous ceramic mold was produced in the same manner as in Comparative Example 1 except that no open-cell foaming agent was added to the hydrophilic urethane prepolymer.

COMPARATIVE EXAMPLE 3

A porous ceramic mold was produced in the same manner as in Example 2 except that an ethylene oxide-propylene oxide copolymer having an average molecular weight of 4,000 was used in preparing the hydrophilic urethane prepolymer.

In Examples 1 and 2, and Comparative Examples 1, 2 and 3, the shrinkage factor (%) of the maximum shrunk area at the drying of the foamed urethane article, the number of articles showing shrinkage per 100 articles, and furthermore the number of ceramic molds cracked during the sintering thereof, and the number of defective ceramic molded articles were measured. The results are shown in the Table below.

TABLE

|  | Example | | Comparative Example | | |
| --- | --- | --- | --- | --- | --- |
|  | 1 | 2 | 1 | 2 | 3 |
| Water Content of Ceramic Slurry ($H_2O$/ceramic material 100) | 50 | 50 | 100 | 100 | 50 |
| Prepolymer Content (per ceramic material 100) | 25 | 25 | 25 | 25 | 25 |
| Presence of Open-Cell Foaming Agent After Drying | Yes | No | Yes | No | No |
| Shrinkage Factor (%) | 2.5 | 3.0 | 4.0 | 17.0 | 10.0 |
| Number of Articles Showing Unacceptable Shrinkage After Sintering | 5 | 15 | 70 | 100 | 50 |
| Number of Cracked Molded Articles | 10 | 20 | 25 | 95 | 75 |
| Number of Defective Molded Articles | 15 | 35 | 75 | 100 | 80 |

EXAMPLE 3

To a ceramic mixture of 37.5 parts by weight of chamotte (calcined clay) (average particle 10μ) and 62.5 parts by weight of Gairome (ball clay) (average particle 5μ) were added 55 parts by weight of water and 0.1 part by weight of sodium pyrophosphate, and the resulting mixture was uniformly mixed and stirred to prepare a ceramic slurry.

Using glycerol as an initiator, 1 mol of an ethylene oxide-propylene oxide copolymer (average molecular weight: 3,000; ethylene oxide content: 75% by weight) and 5 mols of tolylenediisocyanate were reacted at 120° C. for 3 hours to prepare a hydrophilic urethane prepolymer. To 25 parts by weight of the hydrophilic urethane prepolymer (i.e., 25 parts per 100 parts of ceramic material) was added 1.5 parts by weight of the same open-cell foaming agent as used in Example 1.

Thereafter, the thus-obtained ceramic slurry and hydrophilic urethane prepolymer were uniformly mixed and stirred. The thus-obtained mixture was introduced into an L-shaped mold (upstand length: 50 mm; bottom length: 100 mm; width: 50 mm; and thickness: 5 mm) made of aluminum, the inner surface of which had been coated with a silicon-based releasing agent, and reacted and foamed at room temperature for 5 minutes to prepare a foamed urethane molded article.

The foamed urethane article thus obtained was removed from the mold, and thereafter was dried, combusted very slowly, and gradually cooled in the same manner as in Example 1 to obtain a open-cell construction ceramic mold having a bulk specific gravity of 0.4, a porosity of 83%, and a cell diameter of 0.3 mm.

With respect to the shrinkage, deformation and cracking at the drying and sintering stages, the above-obtained article had approximately equal properties to those obtained in Example 1.

While the invention has been described in detail and with reference to specific embodiments thereof, it will be apparent to one skilled in the art that various changes and modifications can be made therein without departing from the spirit and scope thereof.

What is claimed is:

1. A process for producing a porous ceramic molded article comprising adding from about 40 to 60 parts by weight of water to 100 parts by weight of a ceramic material to prepare a ceramic slurry, adding to said slurry from about 20 to 40 parts by weight of a hydrophilic urethane prepolymer having a free isocyanate group content of from about 4% to 7% by weight, which is prepared by reacting an ethylene oxide-propylene oxide copolymer having an average molecular weight of from about 1,500 to 3,500 and an ethylene oxide content of from about 70% to 90% by weight and a polyisocyanate compound containing at least two isocyanate groups at the terminal portions thereof, introducing the resulting hydrophilic urethane prepolymer-ceramic slurry mixture into a mold, reacting and foaming the mixture to form a foamed urethane molded article, drying the thus-formed foamed urethane molded article, and combusting very slowly and sintering the foamed urethane molded article to produce a porous ceramic molded article.

2. A process as in claim 1, wherein the ceramic material consists essentially of kaolin, clay, alumina, feldspar, pottery stone, mullite, zircon, zirconia, titania, silicon carbide, cordierite, or combinations thereof.

3. A process as in claim 1, wherein the ethylene oxide-propylene oxide copolymer has an average molecular weight of from about 2,500 to 3,000.

4. A process as in claim 1, wherein the weight ratio of the hydrophilic urethane prepolymer/water is within the range of from 33/100 to 100/100.

5. A process as in claim 1, wherein an open cell foaming agent is added to the hydrophilic urethane prepolymer in an amount of from about 1 to 2 parts by weight per 100 parts by weight of the ceramic material.

6. A process as in claim 1, wherein the open-cell foaming agent is polydimethyl siloxane-polyoxy alkylene copolymer.

7. A process as in claim 1, wherein the polyisocyanate compound is tolylenediisocyanate or a mixture of tolylenediisocyanate and other polyisocyanate compounds.

8. A process as in claim 1, wherein the dried urethane article is combusted with gradually heating at about 100° C. to 400° C.

* * * * *